US007636782B2

(12) United States Patent
Jordan et al.

(10) Patent No.: US 7,636,782 B2
(45) **Date of Patent: *Dec. 22, 2009**

(54) SYSTEM AND METHOD TO FACILITATE MANAGEABLE AND AGILE DEPLOYMENT OF SERVICES IN ACCORDANCE WITH VARIOUS TOPOLOGIES

(75) Inventors: Kenneth Eugene Jordan, Redmond, WA (US); Erica Sui-Ching Lan, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 217 days.

This patent is subject to a terminal disclaimer.

(21) Appl. No.: 11/969,776

(22) Filed: Jan. 4, 2008

(65) Prior Publication Data

US 2008/0216006 A1 Sep. 4, 2008

Related U.S. Application Data

(62) Division of application No. 10/113,610, filed on Apr. 1, 2002, now Pat. No. 7,340,520.

(51) Int. Cl.
*G06F 15/173* (2006.01)

(52) U.S. Cl. ....................... 709/226; 709/201; 709/203; 717/168; 717/170; 717/176; 717/177; 717/178; 715/700; 715/762

(58) Field of Classification Search ................. 709/201, 709/203, 226; 717/168, 170, 176, 177, 178; 715/700, 762
See application file for complete search history.

(56) References Cited

U.S. PATENT DOCUMENTS

| | | | | |
|---|---|---|---|---|
| 5,682,491 | A | 10/1997 | Pechanek | |
| 6,047,268 | A | 4/2000 | Bartoli et al. | |
| 6,209,095 | B1 | 3/2001 | Anderson | |
| 6,269,377 | B1 | 7/2001 | Collie | |
| 6,282,712 | B1 | 8/2001 | Davis | |
| 6,327,617 | B1 | 12/2001 | Fawcett | |
| 6,327,705 | B1 | 12/2001 | Larsson | |
| 6,347,398 | B1 | 2/2002 | Parhasarathy | |
| 6,990,513 | B2 * | 1/2006 | Belfiore et al. | 709/203 |
| 7,340,520 | B1 * | 3/2008 | Jordan et al. | 709/226 |
| 2002/0138659 | A1 | 9/2002 | Trabaris et al. | |
| 2002/0178297 | A1 | 11/2002 | Lister et al. | |
| 2003/0037328 | A1 | 2/2003 | Cicciarelli et al. | |
| 2004/0015815 | A1 | 1/2004 | Bonilla et al. | |

OTHER PUBLICATIONS

Bedir Tekinerdogan, et al.; "Deriving design aspects from canonical models"; Jul. 1998, pp. 1-7.

* cited by examiner

*Primary Examiner*—Yves Dalencourt
(74) *Attorney, Agent, or Firm*—Shook, Hardy & Bacon L.L.P.

(57) ABSTRACT

The present invention relates to a system and methodology to facilitate service deployment in a distributed computing and applications environment. A schema is provided that describes various components of a service and various topologies for execution of the services, wherein a deployment engine utilizes the schema in conjunction with user inputs to determine one or more destination locations for the service. The topologies relate to various machine and/or machine types defined for various groups or individuals that employ the service. A user interface can be provided to receive user inputs for topological selections and to facilitate various parametric configurations associated with service deployment and subsequent execution thereof.

20 Claims, 14 Drawing Sheets

Fig. 10
500
510
512
514
518
Deployment Wizard - Associate
Set the Server Type for Each Server
danielol-dev
DAD AD, First Server
danielol-xp
Thin Client Access (NDWA, RTC FE, WAP FE)
do-dad-iis
Key Server
do-dad-isa
ISA Server
OK
Cancel

SYSTEM AND METHOD TO FACILITATE MANAGEABLE AND AGILE DEPLOYMENT OF SERVICES IN ACCORDANCE WITH VARIOUS TOPOLOGIES

CROSS-REFERENCE TO RELATED APPLICATIONS

This application is a divisional of Ser. No. 10/113,610, now U.S. Pat. No. 7,340,520, filed Apr. 1, 2002, entitled "SYSTEM AND METHOD TO FACILITATE MANAGEABLE AND AGILE DEPLOYMENT OF SERVICES IN ACCORDANCE WITH VARIOUS TOPOLOGIES". The entirety of the aforementioned patent is incorporated herein by reference.

TECHNICAL FIELD

The present invention relates generally to computer systems, and more particularly to a system and method to manage deployment of services according to diverse group or user requirements and in accordance with a plurality of system topologies relating thereto.

BACKGROUND OF THE INVENTION

Network technologies such as the Internet have provided users and other entities with virtually unlimited access to remote systems and associated applications. This type of access in many cases has become a complex maze of processes that is often offloaded to third-party systems to manage. Application heterogeneity has increased exponentially, and rapid growth has forced enterprises to develop and deploy applications ever faster—even at the expense of integration and ease of administration. Historically, enterprises generally only had to consider these issues at an internal level. In many situations however, these enterprises now have to grant external access to employees, supply chain partners, contractors and customers. Organizations that employ third-party service providers (application, network or otherwise) generally, manage users and access rights across both their internal systems and the systems run by service providers. Moreover, as new applications are developed to meet these challenges, application development, testing and deployment within and/or outside an organization has become increasingly more complicated and expensive.

Applications are often developed and described as one or more services that perform a desired computing function for a user or a group of users, wherein the services are often deployed across many components and systems. As these services are developed, various types of feature, development, testing, operations and/or other type teams or staff are often involved during portions of service development and during the ultimate installation/operation of the services in an operational system. When services are developed in a feature team, for example, the focus is generally placed on the features and associated functionality of the services. Many times, when the services are turned over to an operations team or other type team for integration and deployment, only written documents are included relating to the previous team's deployment architecture which may have little or no relevance to the subsequent team's needs. Thus, the process often fails for a large deployment that involves multiple components, complicated inter-machine coordination, and according to diverse deployment requirements of various teams. Based upon requirements and complexities associated with larger deployments, many problems can be encountered.

One such problem relates to deployment documents that are substantially static in nature and based on a topology defined by a previous team of developers. As an example, if an operations team were to receive deployment instructions from the feature team, the operations team would generally have to perform extrapolation of the feature team's deployment topology in order to deploy services in a topology suitable for the operations team. Such extrapolation is generally error-prone and therefore the reliability for future or different deployments suffers. As a result, deployment in a production environment often fails even though developers and testers claim successful project completion before passing the services to a subsequent team.

Another problem typically encountered relates to various teams utilizing different deployment techniques such as to develop competing script files and packages for service deployment. This can introduce exponential complexity into service development when an operations staff, for example, manages services developed by multiple feature or development teams. Furthermore, integration of services from different feature teams is often done in an ad-hoc manner without substantial planning involved for the overall process from development to operation of the service. Therefore, the lack of a consistent integration scheme often introduces redundancy, inconsistency and complexity, thereby increasing the cost of deployment. Such complexity and inconsistency generally can lead to high operating costs and a low degree of service manageability.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology providing a framework to facilitate manageable and agile deployment of services in accordance with various and/or different deployment topologies. The framework or architecture includes a schema to describe components of a service and provides an engine to deploy an instance of the service, wherein the components of the service can be distributed across multiple machines and/or machine configurations. The engine utilizes a service description defined in accordance with the schema and in conjunction with topology-specific configuration information to deploy one or more components of the service. Based upon the schema and configuration information, components can be deployed to a plurality of diverse topological configurations associated with service execution. A user interface is also provided to receive deployment-time instructions or configuration information that is operative with the schema to select and implement a plurality of deployment topologies relating to various operational, logistical, and topological requirements of users and/or groups. This enables services to be documented, managed and deployed consistently by different groups or users who participate in various stages of a service life cycle.

In accordance with one aspect of the present invention, the schema cooperates with the deployment framework described above to mitigate several problems associated with conventional systems. The schema can define services in terms of a plurality of applications, wherein the applications can be defined in terms of a plurality of installation packages with respective installation packages further describing the constituent components of the service. In accordance with the applications, installation packages, and/or components that describe the service, various deployment topologies can be defined that map the applications of the service according to different architectural or operating requirements of various machines and/or groups. For example, a development topology may utilize more or less machines/servers and/or machine/server types than a testing topology or an operations topology executing the same service. Thus, the framework provides a canonical process for development, testing, integration and execution of a service in accordance with diverse service execution environments associated with various groups and users. As can be appreciated, the schema can be defined and/or described in substantially any language or code (e.g., Extensible Markup Language (XML), Wireless Markup Language (WML), Hypertext Markup Language (HTML), database access/retrieval/storage languages, and so forth).

In one aspect of the framework, the schema enables different topologies deployed by developers, testers, operations and/or other groups to be defined in the same document and processed by a single deployment engine, if desired. It is to be appreciated however, that the schema can be associated with a plurality of related schemas or files and the deployment engine can operate in conjunction with or as part of other engines, if desired. The deployment framework mitigates extrapolation of topological configurations employed by previous groups and facilitates that service deployment in a production environment is generally reliable and predictable. The schema provides a defined process for feature or development teams to package services and define deployment attributes of the services. Service property management can also be defined by the schema and implemented by the deployment engine to provide a canonical integration process for the service. In this manner, utilization of a shared process by multiple feature teams in accordance with a canonical integration process by an operations team or other team facilitates manageability of services.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF THE INVENTION

The present invention relates to a system and methodology to facilitate service deployment in a distributed computing and applications environment. A schema (e.g., XML document/file) is provided that describes various components of a service and various topologies for execution of the services, wherein a deployment engine utilizes the schema in conjunction with user inputs to determine one or more destination locations for the service. The topologies relate to various machine and/or machine types defined for various groups or individuals that employ the service. A user interface can be provided to receive user inputs for topological selections and to facilitate various parametric configurations associated with deployment and subsequent execution of the services.

Figure 1:
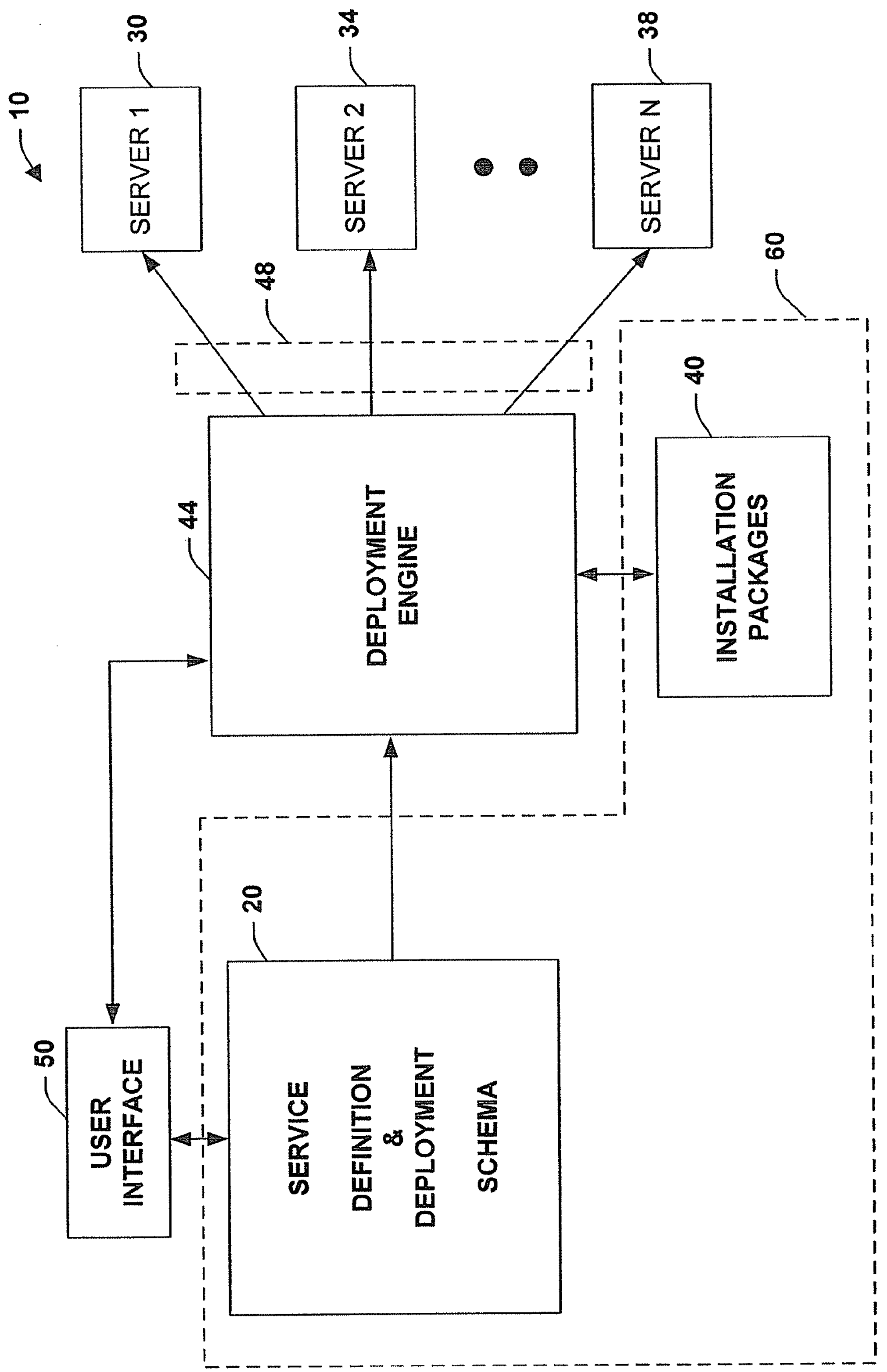
FIG. 1 is a schematic block diagram illustrating a deployment architecture in a distributed computing environment in accordance with an aspect of the present invention.

Referring initially to FIG. 1, a system 10 illustrates a framework or architecture for the agile and manageable deployment of services in a distributed computing environment in accordance with an aspect of the present invention. A service and deployment schema 20 is provided that describes a service and associated service topology that can be deployed to 1 to N servers 30-38, N being an integer. Services defined by the schema 20 can include a plurality of applications that are provided/described as part of one or more installation packages 40, wherein the installation packages are associated with various components of the service such as executables, dynamic link libraries (DLL), files, data structures, data bases, registry configurations, objects, and so forth. A deployment engine 44 utilizes content defined by or contained within the schema 20 to distribute the service or services via the installation packages 40 to the servers 30-38 in accordance with one or more topologies defined by the schema. It is noted that service deployment can occur across a network 48 via one or more signals that include data packets. Alternatively, deployments can occur across local and/or wireless interfaces, signals, and/or connections between the schema 20, the installation packages 40, the deployment engine 44 and the servers 30-38. In addition, the schema 20 and installation packages 40 can reside in a local and/or a remote environment with the deployment engine 44. After deployment, installed services can be operated by a group and/or user according to a selected machine topology, wherein the selected topology defines which servers 30-38 and/or server types can execute the service.

A user interface 50 can be provided to select a desired service topology and provide associated configurations in accordance with deployment of the service. In one aspect, the user interface 50 can be provided as a deployment wizard or sequence of graphical user interface (GUI) displays that guide users through a plurality of selection options. As will be described in more detail below, configurations can include user input properties that define general and private properties, for example. General properties can include configuration information applying to a plurality of installation packages 40, whereas private properties can apply to a selected installation package 40. In addition, application properties can be configured that relate to which servers 30-38 the installation packages are mapped to or installed.

It is to be appreciated that although a single schema 20 and deployment engine 44 are illustrated in the system 10 that a plurality of such components can be provided in accordance with the present invention. For example, the deployment engine 44 can be configured as a plurality of cooperative computing components (e.g., servers or clients operating over a network) that are adapted to distribute services in accordance with the schema 20. Similarly, the schema 20 can be configured as a plurality of schemas, nested schemas and/or related files that describe various topologies and configurations in accordance with the present invention. It is further to be appreciated that although deployment of services is illustrated to the server components 30-38 that deployment can occur within or to substantially any type of distributed computing environment. For example, the servers 30-38 can be arranged as a plurality of client machines and/or as a combination of clients and servers, wherein respective clients and servers have various portions of the service distributed thereto as defined by the schema 20. Furthermore, the schema 20 and the installation packages 40 can be combined, transported and/or stored as a deployment package 60 on substantially any type of computer medium such as a database, CD-ROM, floppy, DVD, and so forth.

Figure 2:
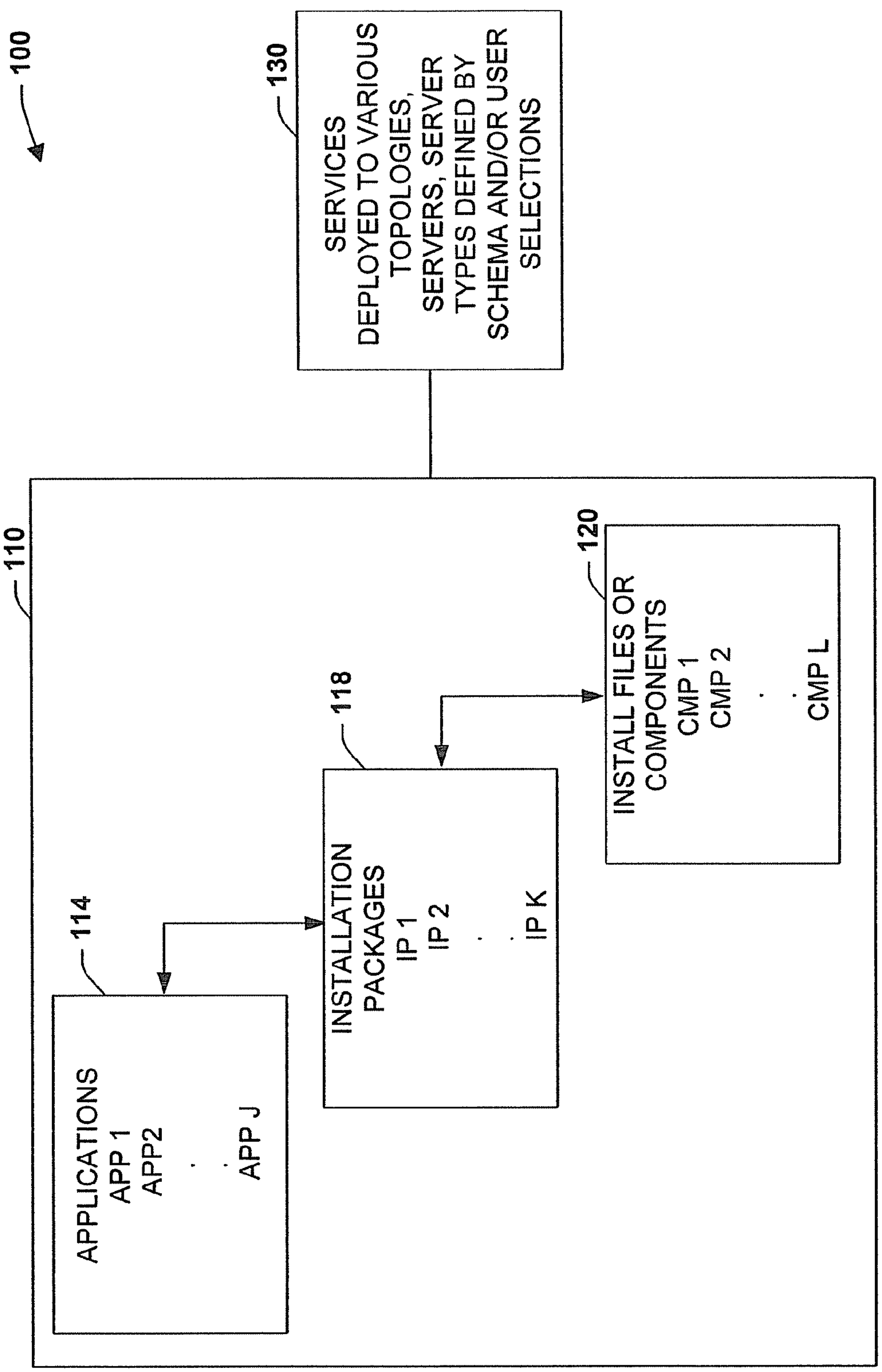
FIG. 2 is a diagram illustrating service configurations in accordance with an aspect of the present invention.

Referring now to FIG. 2, a diagram 100 illustrates service configurations in accordance with an aspect of the present invention. Services can be defined within a schema 110 as one to J applications 114, J being an integer. Applications 114 generally define logical executable units that cooperate to perform a respective service. Respective applications 110 can be further defined as 1 to K installation packages 118, wherein the installation packages 118 can include 1 to L installation files or components 120 that are installed on machines to operate or execute the service, K and L being integers respectively. It is to be appreciated that further subdivisions and/or hierarchies are possible. As will be described in more detail below, the schema 110 can be created, edited, and/or maintained based upon an XML language, although other languages or structures are possible.

At 130 various topologies, servers, and/or server types can be defined in accordance with the schema 110. The topologies define machine and/or logical configurations for execution of the service, whereas the servers define which servers are available for service execution and server types relate to which components are actually installed on the available servers having associated server types. The information provided at 130 can include user input information to indicate a desired topology for deployment, available servers in which to deploy, server type information, and/or include configuration information which is described in more detail below. By providing definitions for a plurality of operating topologies in the schema 110, and enabling user input to adjust topological and machine configurations at deployment time of the service, the present invention mitigates having to extrapolate/determine deployment conditions and/or instructions from a previous group of users that may utilize a vastly different deployment scheme. Thus, a canonical framework is provided by the schema 110 and deployment 130 topologies that facilitate efficient deployment according to a plurality of diverse instances associated with multiple groups or users of the service.

Figure 3:
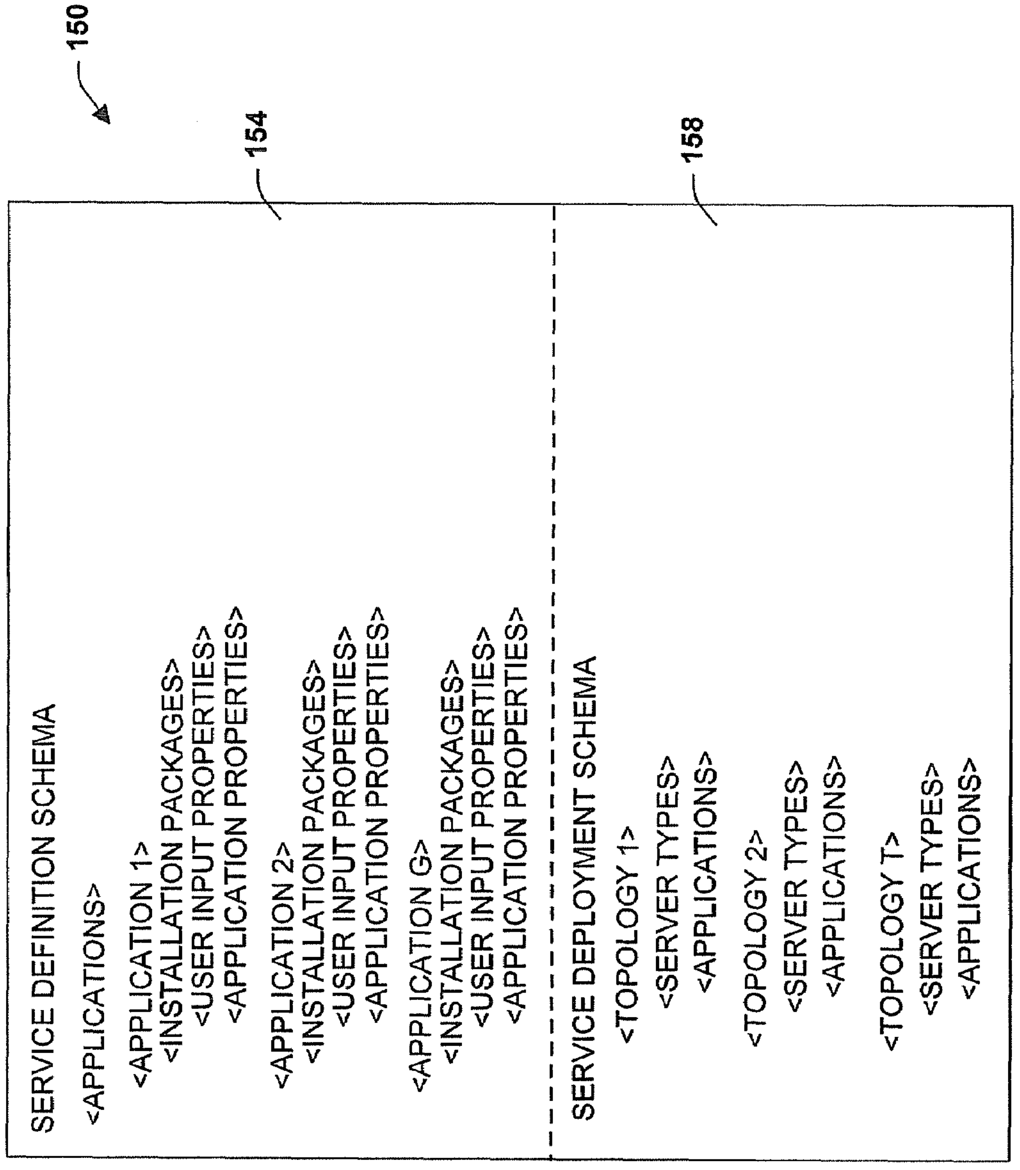
FIG. 3 is a diagram illustrating a schema in accordance with an aspect of the present invention.

Turning now to FIG. 3, a schema 150 is illustrated in accordance with an aspect of the present invention. The schema 150, which can include XML and can be adapted or configured as a service definition portion 154 and a service deployment portion 158. In the service definition portion 154, 1 through G applications are defined, G being an integer, wherein respective applications can have one or more associated installation packages, user input properties, and application properties. In the service deployment portion 158, one to T topologies can be defined, T being an integer, wherein respective topologies can be associated with one or more server types and applications that are to be deployed according to the defined topology and associated server type.

The schema 150 provides a framework in conjunction with the deployment engine described above to guide service producers or developers in packaging the services and exposing service attributes for the purpose of deployment. As an example, a feature team's developers generally define several of the schema components in order to deploy the services. One such component is the application consisting of a group of installation packages that generally run or execute on the same machine. The installation packages assemble installation files or components and define associated configurations. Generally, all or most of the software components included in a single installation package will be installed on the same machine. The installation package can however retrieve and update configuration information in a remote configuration store, for example. Another component defined initially in the schema 150 is the topology that organizes services into server types and specifies which applications are to be installed on respective server types. As noted above, multiple topologies can be defined to meet the needs of different groups working with the service, such as development, testing, operations, and/or other groups.

The schema 150 further describes configuration properties for the installation packages and specifies how properties are managed by the deployment engine. For example, two or more such categories of properties can be defined such as the user input properties and the application properties. Regarding user input properties, these values can be entered by an operator at deployment time, wherein such properties can include private and general properties, for example. Private properties generally relate to values that are associated with a single installation package, whereas with general properties, a single input value from an operator can be applied by more than one installation package. In regards to application properties, several property types can be defined. These types can include server list properties that provide a mapping of servers or other type machines to associated applications. The value can be a list of physical server/client names that have a specified application installed. A static property can be provided that includes values that are specified as part of the application definition in the schema 150.

The following XML fragment is provided for exemplary purposes only. In this fragment, three applications are defined that are named Provisioning, DCToolsFE, and DCToolsBE.

The letters "ip" refer to an installation package file specification. It is noted that DCToolsFE and DCToolsBE define different static property values.

EXAMPLE 1

```
<application name="Provisioning">
    <iplist>
        <ip name="provisioning.ip">
    </iplist>
</application>
<application name="DCToolsFE">
    <ipilist>
        <ip name="DCTools.ip" >
            <property name="IS_FRONTEND" type="static"
            value="1">
        </ip>
    </iplist>
</application>
<application name="DCToolsBE">
    <iplist>
        <ip name="DCTools.ip" >
            <property name="IS_FRONTEND" type="static"
            value="0">
        </ip>
    </iplist>
</application>
```

Figure 4:
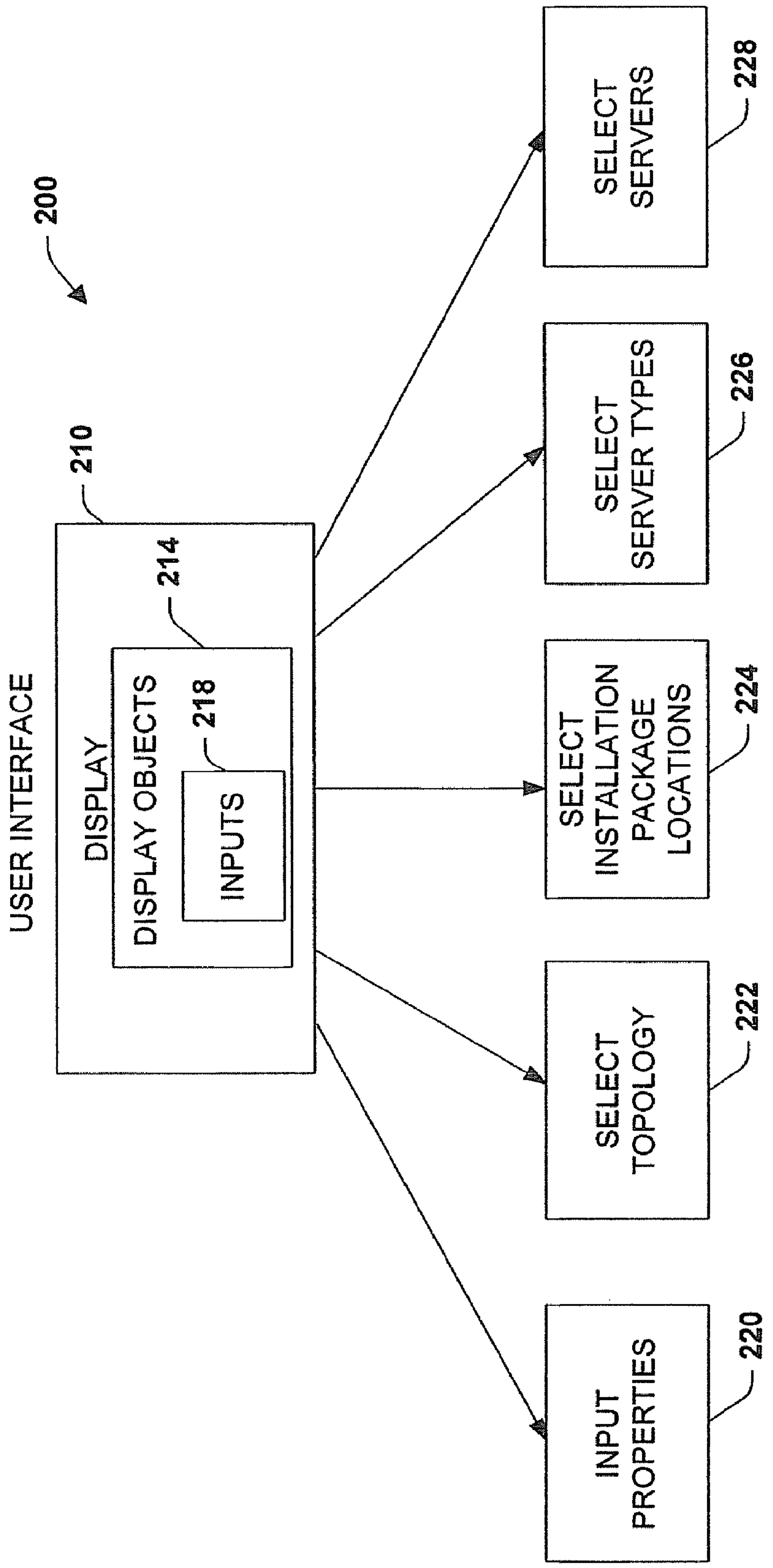
FIG. 4 is a diagram illustrating a user interface and deployment selections in accordance with an aspect of the present invention.

Referring to FIG. 4, a system 200 illustrates a user interface 210 and deployment selections in accordance with an aspect of the present invention. The user interface 210 generally includes an associated display 214 to provide feedback and output data to a user regarding various aspects of service deployment. The display 214 can include display objects (e.g., icons, buttons, sliders, input boxes, selection options, menus, tabs and so forth) having multiple dimensions, shapes, colors, text, data and sounds to facilitate service deployment. In addition, various menus and alternative screens or display outputs can be provided that perform a plurality of aspects of the present invention and will be described in more detail below. The user interface 210 can also be associated with a plurality of inputs 218 for adjusting and configuring one or more aspects of the present invention. This can include receiving user commands from a mouse, keyboard, speech input and/or other device to effect operations of the interface.

The user interface 210 facilitates various configuration and deployment aspects of the present invention. At 220, input properties such as the private and general properties described above can be configured. At 222, a desired topology such as a testing topology or a production topology is selected although, as can be appreciated, a plurality of other topologies are possible. At 224, one or more locations are selected that define where the installation packages can be retrieved for deployment. For example, these locations can include database addresses, CD-ROM drive location, hard drive location, server location, and/or a Universal Resource Locator (URL) address in addition to other locations. At 226, server types are selected. As possible example of a server type, a server can be classified as a front-end server. Another designation can be a back-end server. It is to be appreciated that a plurality of such type designations can be provided in accordance with the present invention. At 228, a subset of desired servers, clients, and/or machines are selected for actual deployment of the service. For example, ultimate deployment of a service may be to deploy to a hundred or more servers. Yet during testing or some other deployment phase, less than one hundred machines are presently available. Thus, the machines that are presently available and/or desired for a current deployment are selected at 228.

Figure 5:
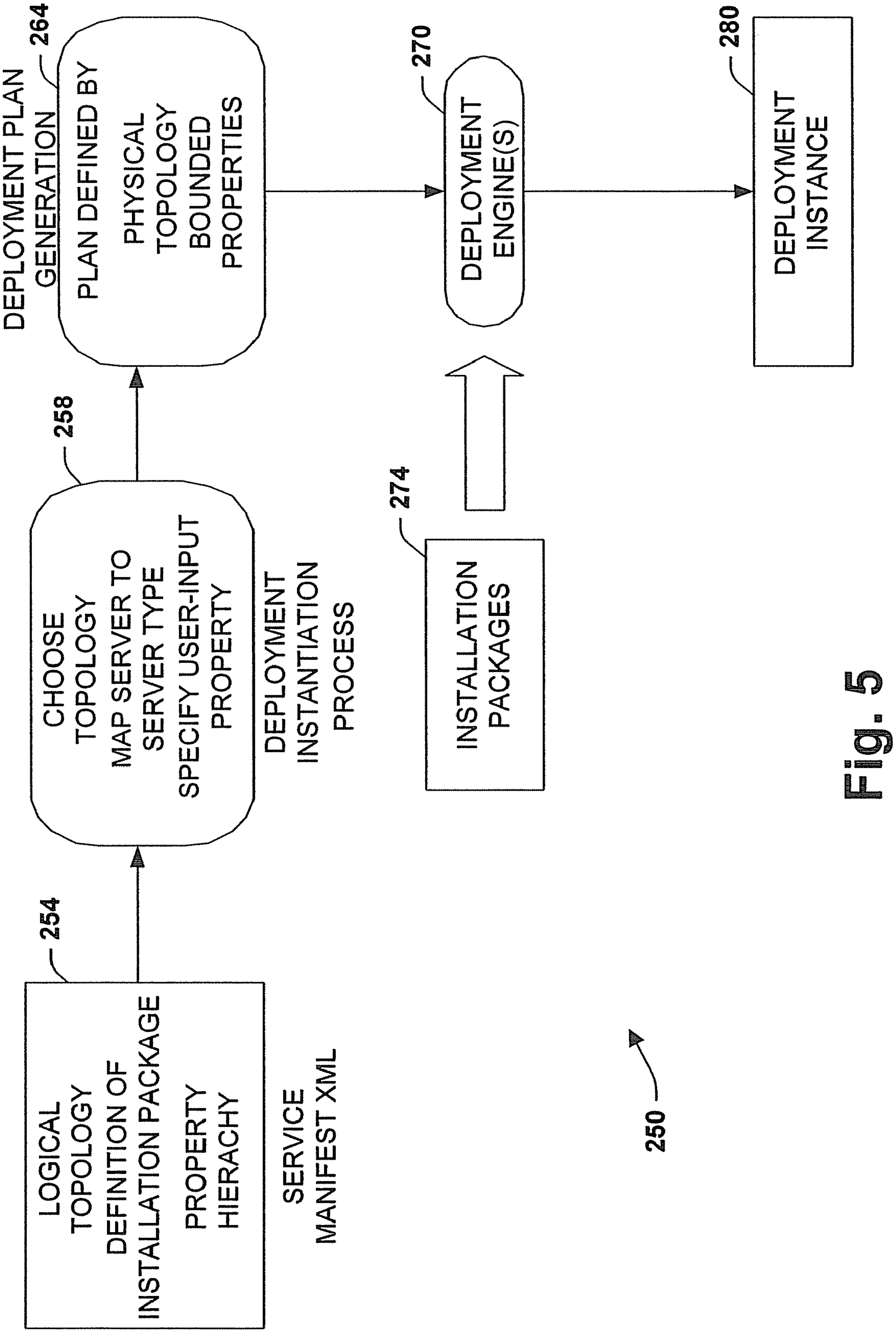
FIG. 5 is a flow diagram illustrating a process for service deployment in accordance with an aspect of the present invention.

FIG. 5 illustrates a methodology to facilitate deployment of services in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 5, a flow diagram 250 illustrates a service deployment in accordance with an aspect of the present invention. At 254, a deployment manifest is defined. The manifest can be described in XML and define such aspects a logical topology, definition of one or more installation packages, and/or a description of a deployment property hierarchy or hierarchies. At 258, user input is solicited and/or received for configuration information. This aspect can be part of a deployment instantiation process, wherein a desired topology is selected, servers or machines are mapped to server or machine types, and user input properties are specified. At 264, a deployment plan is generated. The plan can include such aspects as a physical topology of machines and bounded properties that map services to the physical topology. At 270, a deployment engine or engines retrieves one or more installation packages at 274 in accordance with the deployment plan of 264. At 280, a deployment instance for the service is created/deployed by the deployment engine to associated machines in accordance with the plan.

The deployment engine or engines at 270, enables a user to bind the service definition specified at 254 and/or 258 to a designated set or subset of servers/machines. As discussed, one aspect is to select a topology at 258. For example, a developer may select a single-machine test topology, wherein a data center operator may select a production topology having a plurality of machines. Another aspect is to assign a server type to respective servers at 258. The deployment engine 270 utilizes this information to determine which components are installed on respective servers, and/or to determine values for the server list properties described above. Still yet another aspect at 258 is to provide values for user input configuration properties. Development, testing, operations, and/or other groups can follow a similar process, thus providing a consistent deployment experience. Given the information defined by the manifest 254 and/or user input at 258, the deployment engine 270 installs the designated components on respective servers or machines, passing the associated configuration property values to respective installation packages.

Figure 6:
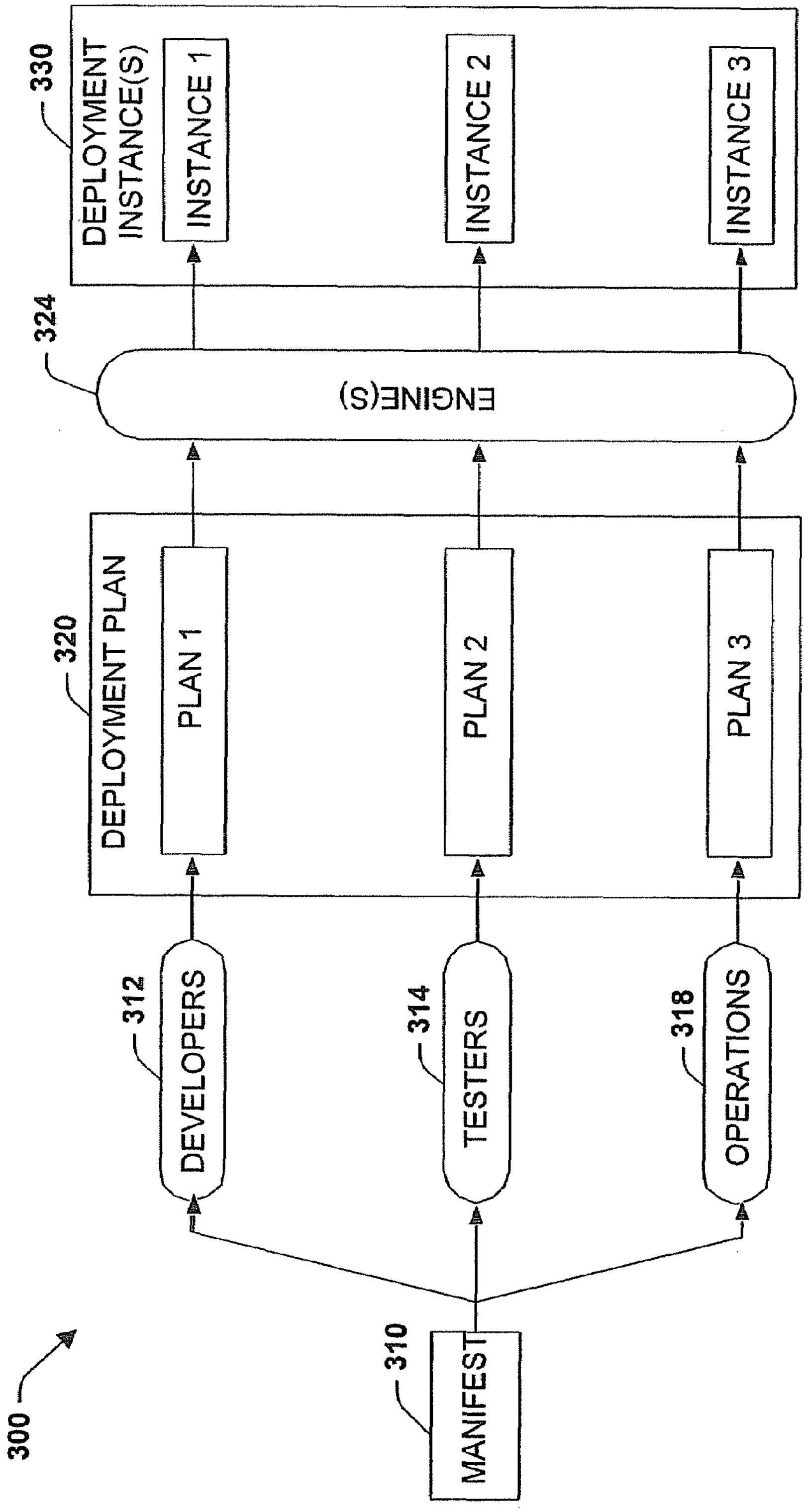
FIG. 6 is a diagram illustrating multiple topological deployment in accordance with an aspect of the present invention.

Referring now to FIG. 6, a system 300 illustrates multiple topological deployment and associated instances of deployment in accordance with an aspect of the present invention. Although three deployments are illustrated in the system 300 for exemplary purposes, it is to be appreciated that a plurality of such deployments can occur. At 310, a manifest is generated that describes deployment topologies and configurations for a development group, a testing group, and an operations group. At 312-318, developers, testers, and/or operations groups provide configuration information regarding deployment options associated with these respective groups. At 320, three deployment plans are generated that are related to deployment requirements of the various groups. At 324, one or more deployment engines execute the deployment plans generated at 320 and distribute three deployment instances of a service at 330 according to the manifest definitions at 310 and the inputs received at 312-318. As described above, the service instances at 330 can be deployed according to a plurality of diverse topologies including various combinations of machines, servers, and/or clients and according to different group needs and/or goals.

Figure 7:
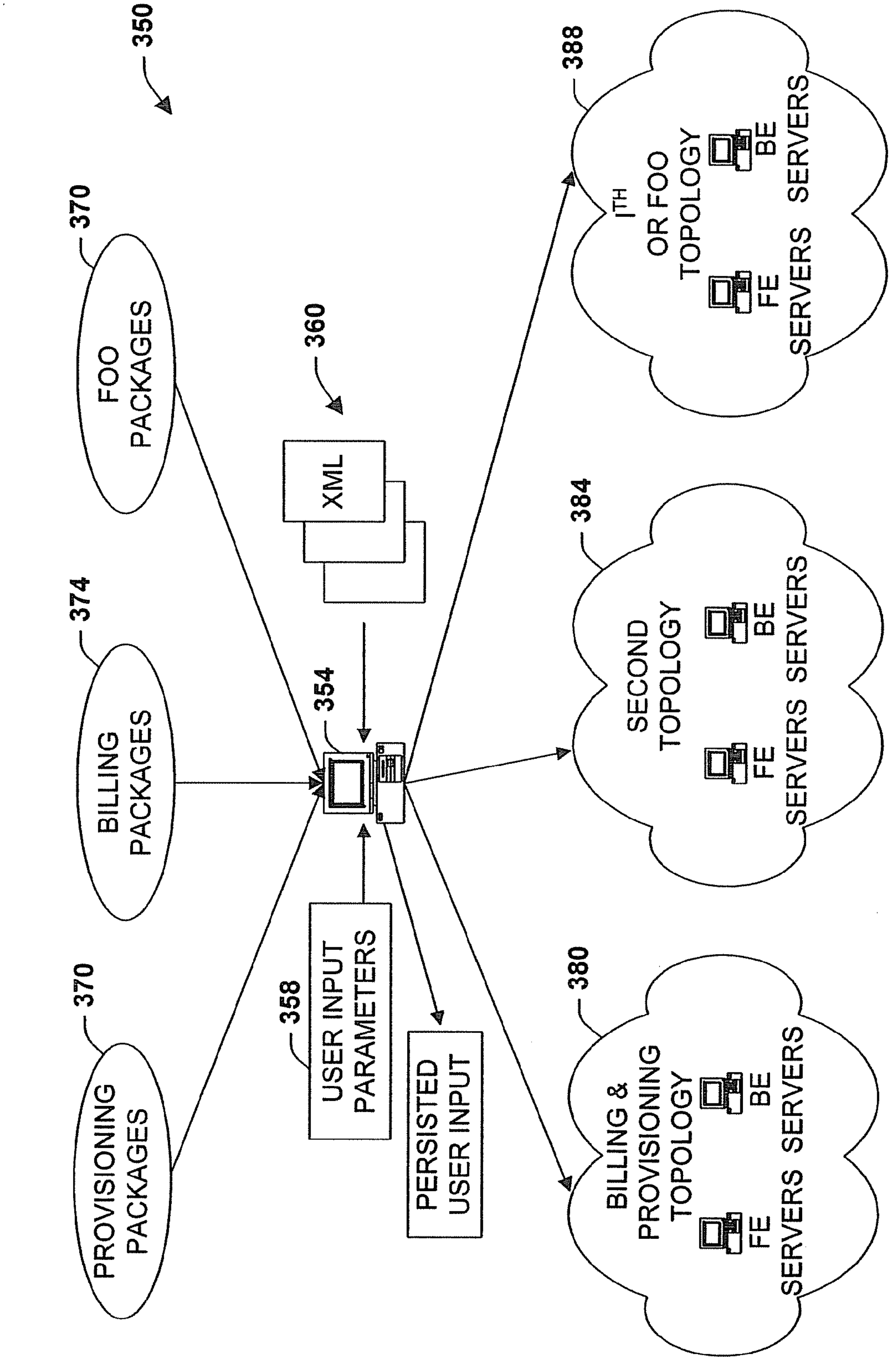
FIG. 7 is a diagram illustrating an exemplary deployment according to a billing and provisioning system in accordance with an aspect of the present invention.

Turning to FIG. 7, a system 350 illustrates an exemplary deployment according to a billing and provisioning architecture in accordance with an aspect of the present invention. It is noted, that the present invention can be employed with substantially any type of service or application. One possible service to deploy is an instance of a billing and/or provisioning system as depicted in the system 350. Provisioning systems automate the task of establishing new users' rights and privileges across multiple applications. For example, these systems can augment existing security practices by enabling administrators to automate changes in employment status and responsibility across business partner networks. Other types of provisioning systems can be designed to manage financial interactions between parties including automated billing between partners, service providers and/or other parties. These systems often include a rules engine and workflow system, a logging and audit system, a database to support the workflow and auditing tasks, and agents that communicate with applications to add, delete, suspend or change users and privileges. Thus, services associated with billing and provisioning systems or other applications can include a plurality of components, applications, installation packages, machines, machine types, and/or topologies.

A workstation 354 is provided that receives user input at 358 and one or more XML schemas at 360 in accordance with a billing and provisioning service. The billing and provisioning service can be described according to a provisioning installation package at 370, a billing installation package at 374, and a Foo installation package at 378. In accordance with the user input at 358 and the XML schemas at 374, a billing and provisioning topology can be generated at 380 having a plurality of machine types (e.g., frontend, backend servers). A second topology can be generated at 384, and an Ith topology is generated at 388 relating to the Foo installation packages at 378, I being an integer. As illustrated, various topologies can be generated to perform one or more portions of a desired service. Alternatively, unrelated services can be deployed in accordance with various topologies available from the various combinations of installation packages selected.

FIGS. 8-13 illustrate a deployment wizard or graphical user interface for service deployment in accordance with the present invention. In addition, Example 2 below depicts exemplary XML files including a service definition schema and a service deployment schema that can be operated upon by the user interface and/or the processes and systems described above. As an example, the deployment wizard described in FIGS. 7-13 accepts installation package references as input and provides a user interface for configuring different installation packages. It is noted that general properties can be shared across multiple installation packages, whereas Private properties are generally utilized within a single installation package. As noted above, the present invention supports remote deployment to multiple topologies and server types by maintaining a mapping between various topologies such as (Topology Type)->Server type->Installation Packages. The mapping is generally achieved via the service deployment XML file and the service definition XML file. Example 2 illustrates an aspect of these type deployment files, wherein "ip" is an installation package designator. As noted above, deployment of services can be applied to substantially any type of service and/or associated application.

EXAMPLE 2

ServiceDeployment.xml

```
<deployment>
    <topologies>
        <topology name="bvt">
            <serverType name="bvtFE">
                <applicationList />
            </serverType>
            <serverType name="bvtBE">
                <applicationList>
                    <application name="Provisioning" />
                    <application name="ResourceMgr" />
                </applicationList>
            </serverType>
        </topology>
    </topologies>
</deployment>
```

ServiceDefinition.xml

```
<definition>
    <applications>
        <application name="Provisioning">
            <iplist>
                <ip name="provisioning">
                    <property name="HST__PROV__RMSERVER" type="server__list"
application="resourcemgr"/>
                </ip>
            </iplist>
        </application>
        <application name="ResourceMgr">
            <iplist>
                <ip name="resourcemgr" />
```

-continued

```
            </iplist>
        </application>
    </applications>
    <generalProperties>
        <generalProperty key="ServiceAccountName"
                prompt="Service Account Name"
                helpString="Enter the user name of the account to use to run the Hosting
services."
                default="HstServiceAcct" />
        <generalProperty key="ServiceAccountPassword"
                prompt="Service Account Password"
                helpString="Enter the password of the account to use to run the Hosting
services."
                default=""
                type="string" />
    </generalProperties>
    <ips>
        <ip name="provisioning">
            <ipGeneralProperties>
                <ipGeneralProperty propertyName="HSTSVCACCT"
key="ServiceAccountName"/>
                <ipGeneralProperty propertyName="HSTSVCPASSWORD"
key="ServiceAccountPassword"/>
            </ipGeneralProperties>
            <privateProperties>
                <privateProperty propertyName="HST__LOGSVC__LOGPATH"
                    prompt="Provisioning Log File"
                    helpString="Enter the path to use for the Provisioning Log file"
                    default="[%systemdrive]:\kws\auditdb"
                    type="string" />
            </privateProperties>
        </ip>
        <ip name="resourcemgr">
            <ipGeneralProperties>
                <ipGeneralProperty propertyName="HSTSVCACCT"
key="ServiceAccountName"/>
                <ipGeneralProperty propertyName="HSTSVCPASSWORD"
key="ServiceAccountPassword"/>
            </ipGeneralProperties>
        </ip>
    </ips>
</definition>
```

Figure 8:
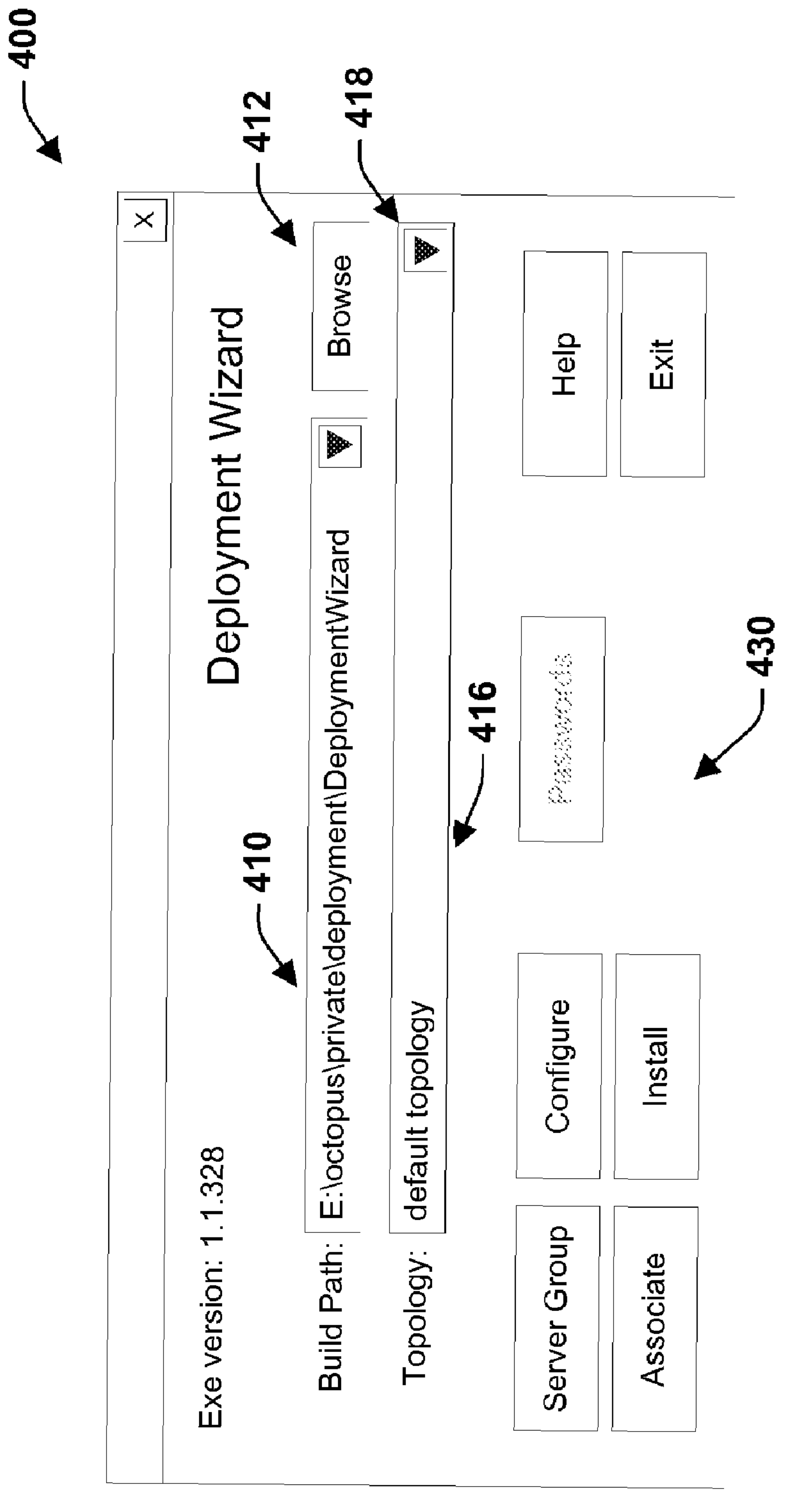
FIG. 8 is a diagram illustrating a deployment user interface to select a topology in accordance with an aspect of the present invention.

FIG. 8 is a diagram illustrating an opening page, menu and/or sequence user interface 400 to select and deploy services according to a desired topology in accordance with an aspect of the present invention. The interface 400 enables selection of a location of installation packages or files at 410 that can include a browse option for locating files at 412. This can also include a location of the service definition and deployment files described above. At 416 a topology can be selected from a plurality of topologies (e.g., default topology initially configured), wherein a list input 418 can be selected to view/select other topologies. As illustrated at 430, other options or display objects can be selected such as server group options, associate options, configure options, install options, help, and exit options.

Figure 9:
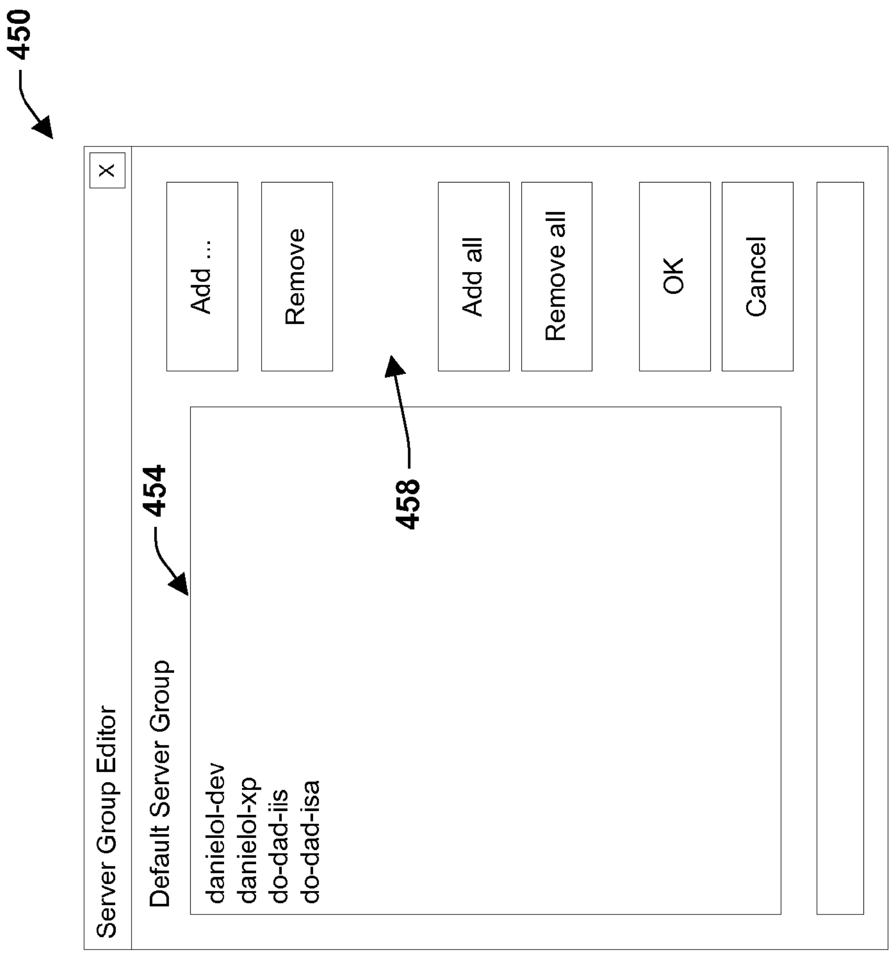
FIG. 9 is a diagram illustrating a deployment user interface to select a server group in accordance with an aspect of the present invention.

FIG. 9 is a diagram illustrating a deployment user interface 450 to select a server group in accordance with an aspect of the present invention. A server group can be selected at 454 to enable users to define a list of machines for operation of a service. It is noted that it is possible to add one machine, multiple machines (using wildcards or other designation) and all of the machines in a domain, for example. To facilitate server group selection, add, remove, add all and/or remove all options can be provided at 458.

Figure 10:
FIG. 10 is a diagram illustrating a deployment user interface to select a server type in accordance with an aspect of the present invention.

FIG. 10 is a diagram illustrating a deployment user interface 500 to select a server type in accordance with an aspect of the present invention. The interface 500 displays the servers previously defined in the server group 454 and enables users to select a desired Server Type for respective servers at 510-518 (e.g., first server, thin client, key server, front-end server, backend server, ISA server and so forth). It is noted that server type selections provided at 510-518 can be based on the topology selected at the interface 400. It is also noted that the interface 500 is dynamic in that more or less server type selection options 510-518 can be provided depending on the number of servers selected at 454.

Figure 11:
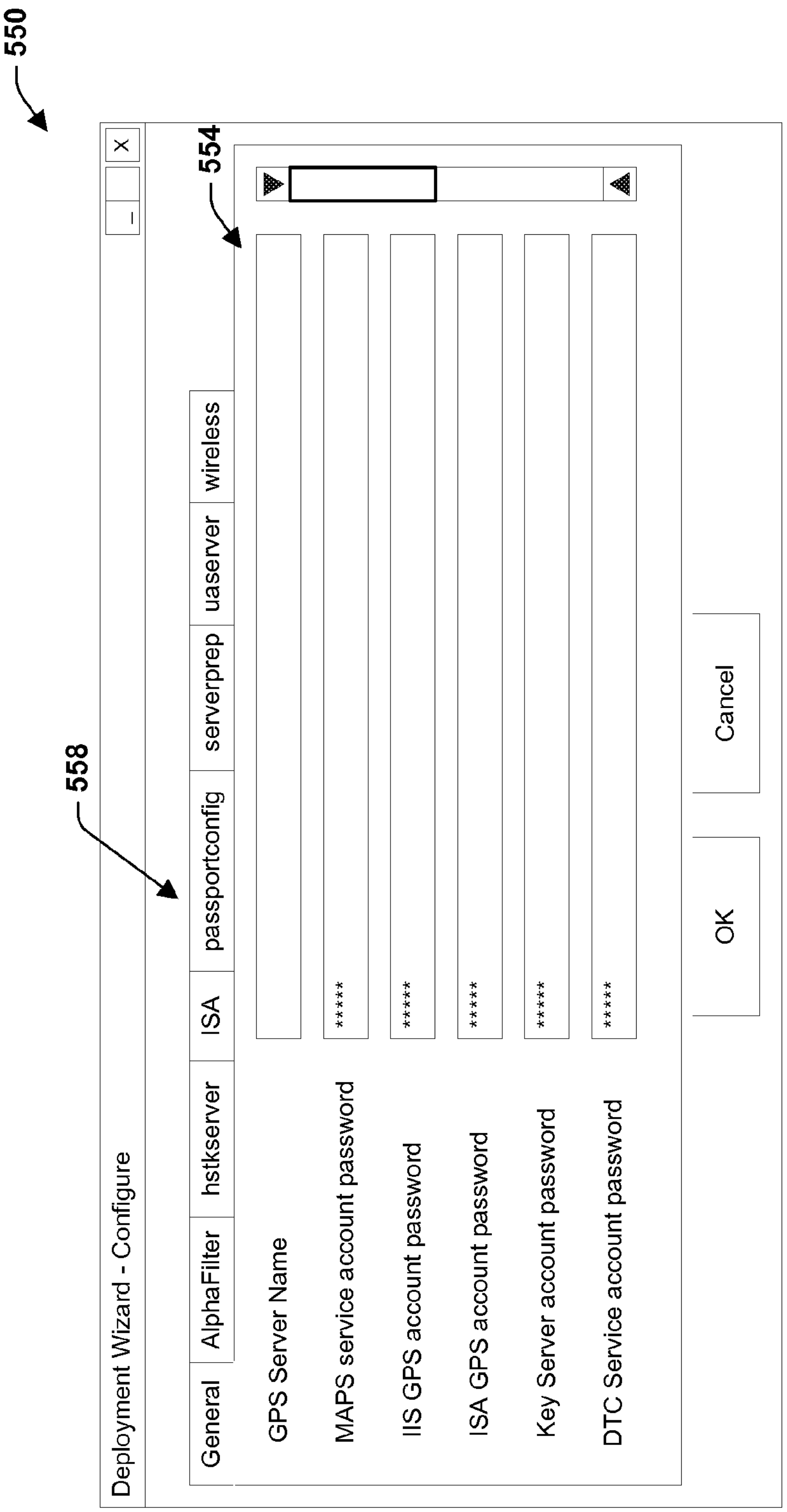
FIG. 11 is a diagram illustrating a deployment user interface to configure properties in accordance with an aspect of the present invention.

FIG. 11 is a diagram illustrating a deployment user interface 550 to configure account properties in accordance with an aspect of the present invention. The interface 550 enables users to set different values for parameters associated with different installation packages. These values can include password information selected from input boxes and associated slider at 554. In addition, other options can be selected such as filter options, server options, ISA options, passport options, and wireless options, for example illustrated at tabs 558.

Figure 12:
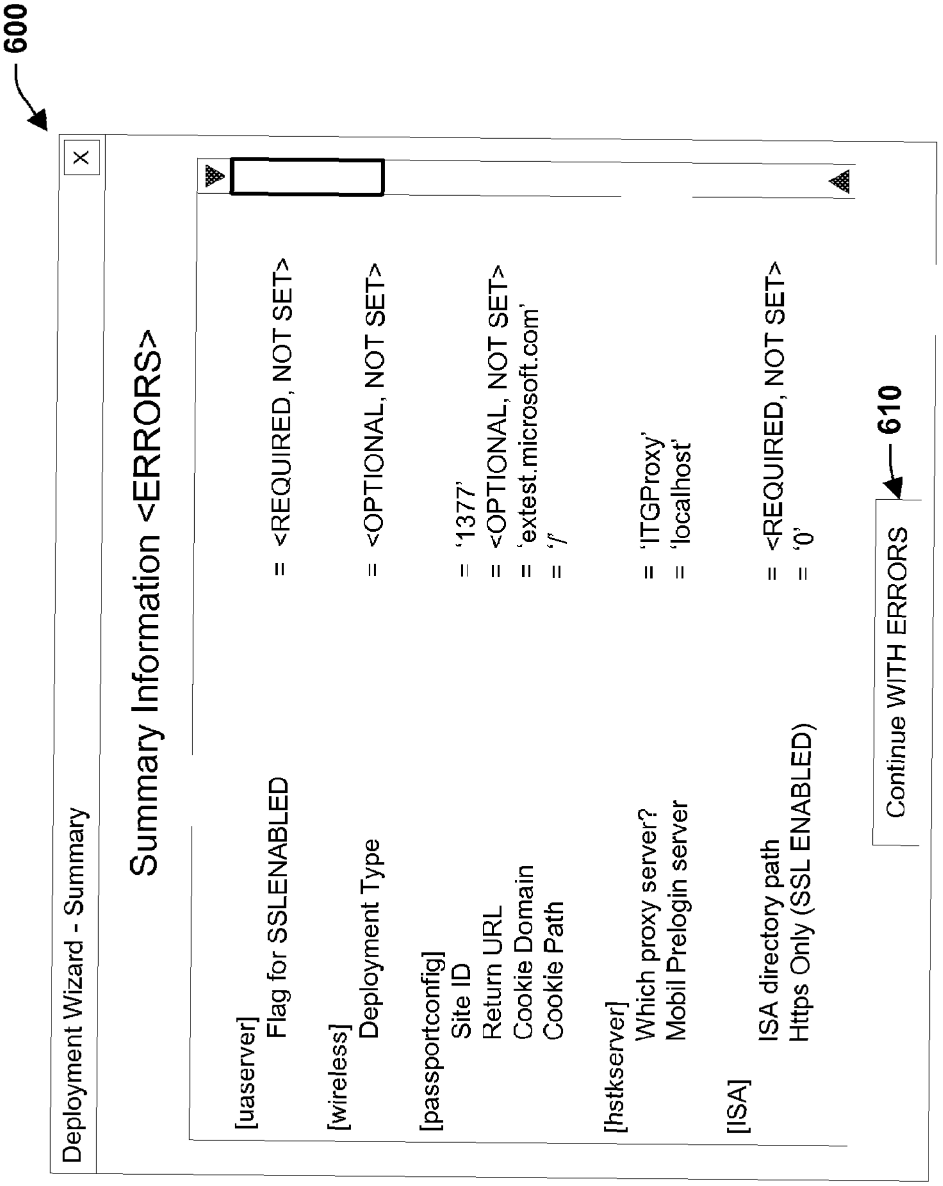
FIG. 12 is a diagram illustrating a deployment user interface to provide deployment feedback in accordance with an aspect of the present invention.

FIG. 12 is a diagram illustrating a deployment user interface 600 to provide deployment feedback in accordance with an aspect of the present invention. The interface 600 displays a summary of the user's choices and indicates errors/warnings (if found) that relate to the previous selections. For example, the warnings can be a result from incompatible options that have previously been selected and/or from invalid locations or addresses that have been input by the user. In general, users reconfirm their previous actions at 610 (e.g., select continue with errors option) before executing an install/uninstall of a service.

Figure 13:
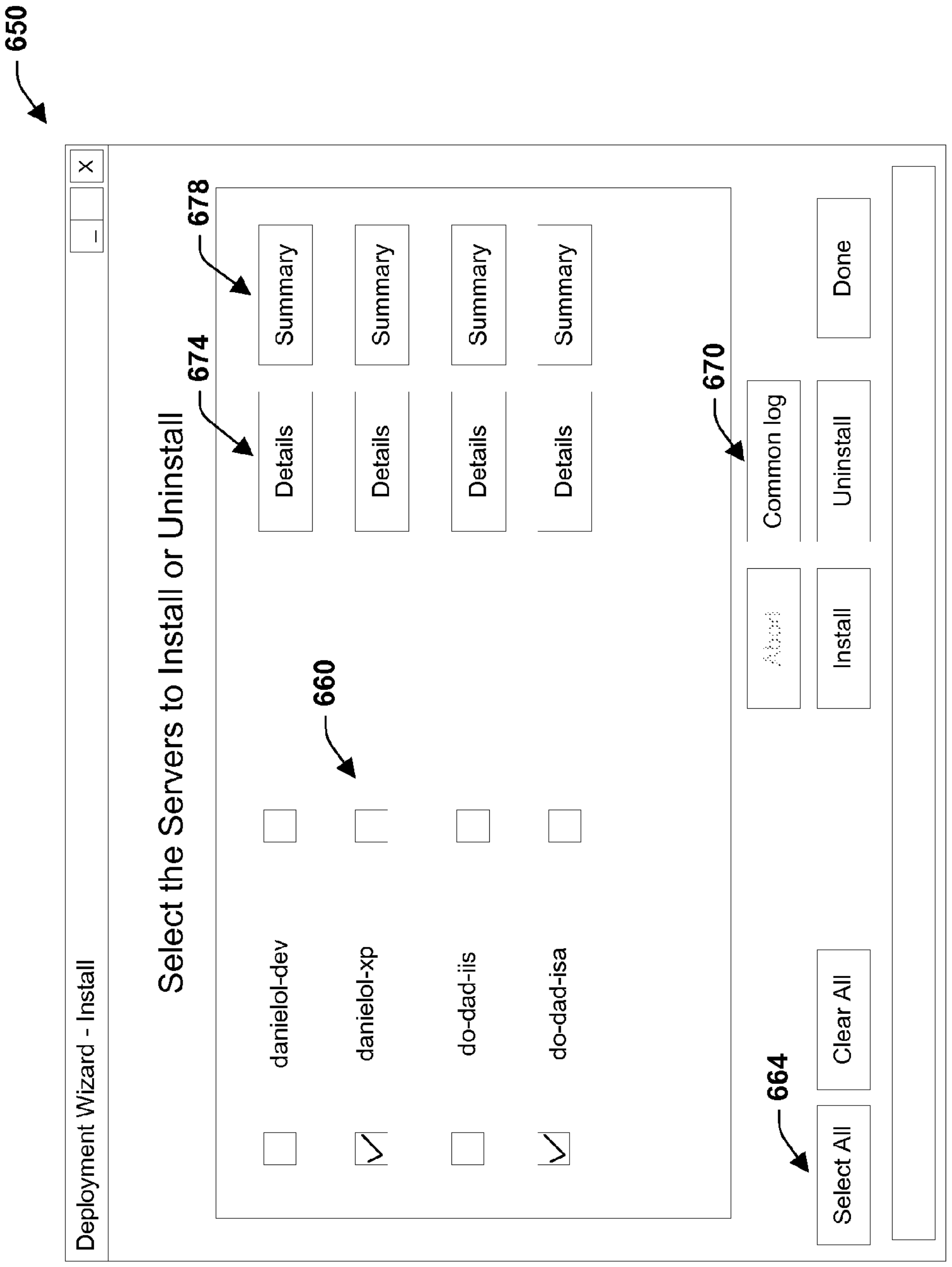
FIG. 13 is a diagram illustrating a deployment user interface to select a server in accordance with an aspect of the present invention.

FIG. 13 is a diagram illustrating a deployment user interface 650 to select a server or subset of servers for installation and/or un-installation of a service in accordance with an aspect of the present invention. The interface 650 enables users to install or uninstall services according to options that have previously been selected in interfaces 400-600. The interface 650 enables users to select servers that are desired for deployment of services at 660 (e.g., check boxes). Users can select to install to individual and/or all servers by selecting the inputs at 660 or selecting a select all box at 664. As illustrated, other user feedback options can be selected such as log options at 670, detail options at 674, and/or summary options at 678 that relate to the service installation or de-installation process.

Figure 14:
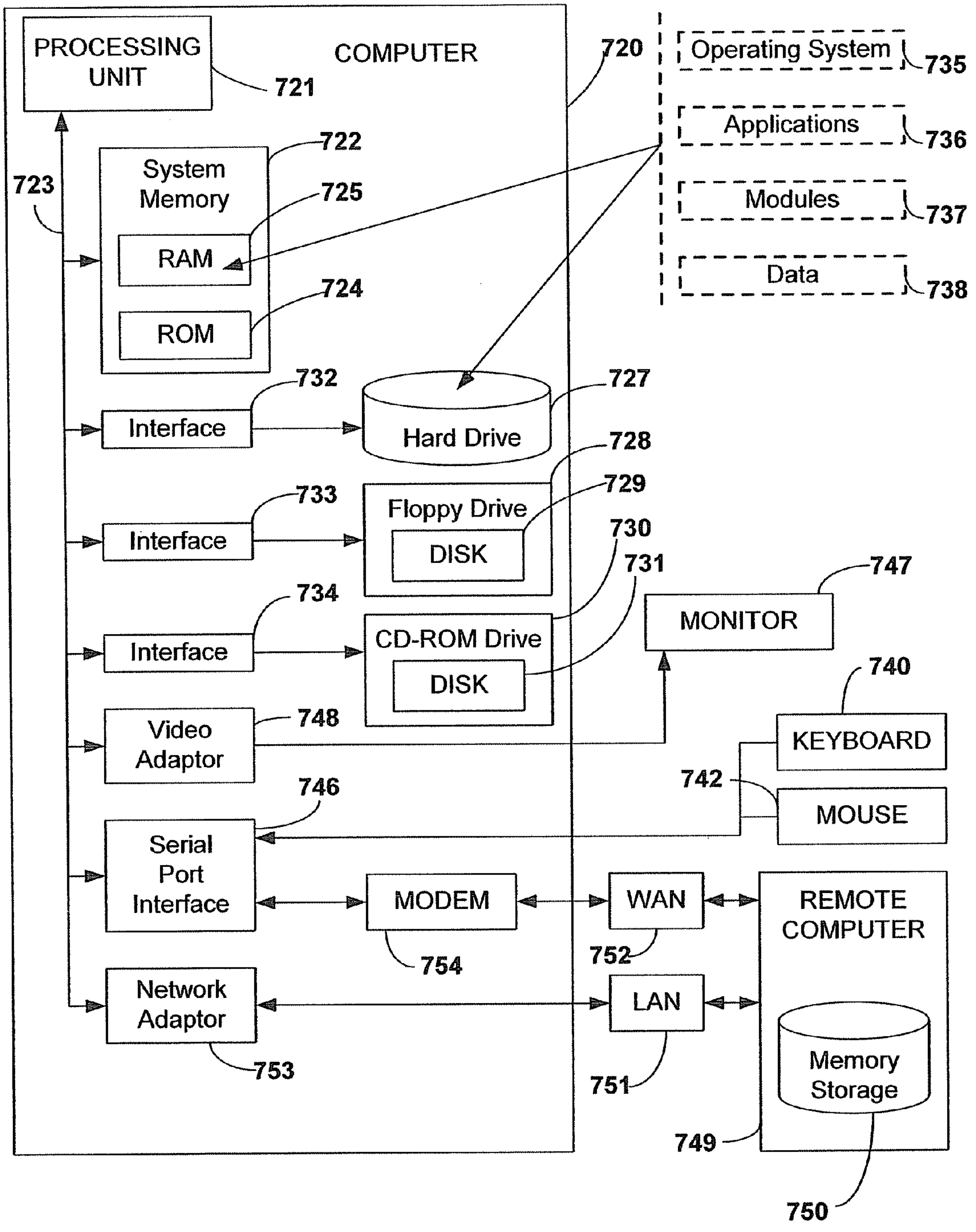
FIG. 14 is a schematic block diagram illustrating a suitable operating environment in accordance with an aspect of the present invention.

In order to provide a context for the various aspects of the invention, FIG. 14 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 14, an exemplary system for implementing the various aspects of the invention includes a computer 720, including a processing unit 721, a system memory 722, and a system bus 723 that couples various system components including the system memory to the processing unit 721. The processing unit 721 may be any of various commercially available processors. It is to be appreciated that dual microprocessors and other multi-processor architectures also may be employed as the processing unit 721.

The system bus may be any of several types of bus structure including a memory bus or memory controller, a peripheral bus, and a local bus using any of a variety of commercially available bus architectures. The system memory may include read only memory (ROM) 724 and random access memory (RAM) 725. A basic input/output system (BIOS), containing the basic routines that help to transfer information between elements within the computer 720, such as during start-up, is stored in ROM 724.

The computer 720 further includes a hard disk drive 727, a magnetic disk drive 728, e.g., to read from or write to a removable disk 729, and an optical disk drive 730, e.g., for reading from or writing to a CD-ROM disk 731 or to read from or write to other optical media. The hard disk drive 727, magnetic disk drive 728, and optical disk drive 730 are connected to the system bus 723 by a hard disk drive interface 732, a magnetic disk drive interface 733, and an optical drive interface 734, respectively. The drives and their associated computer-readable media provide nonvolatile storage of data, data structures, computer-executable instructions, etc. for the computer 720. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 725, including an operating system 735, one or more application programs 736, other program modules 737, and program data 738. It is noted that the operating system 735 in the illustrated computer may be substantially any suitable operating system.

A user may enter commands and information into the computer 720 through a keyboard 740 and a pointing device, such as a mouse 742. Other input devices (not shown) may include a microphone, a joystick, a game pad, a satellite dish, a scanner, or the like. These and other input devices are often connected to the processing unit 721 through a serial port interface 746 that is coupled to the system bus, but may be connected by other interfaces, such as a parallel port, a game port or a universal serial bus (USB). A monitor 747 or other type of display device is also connected to the system bus 723 via an interface, such as a video adapter 748. In addition to the monitor, computers typically include other peripheral output devices (not shown), such as speakers and printers.

The computer 720 may operate in a networked environment using logical connections to one or more remote computers, such as a remote computer 749. The remote computer 749 may be a workstation, a server computer, a router, a peer device or other common network node, and typically includes many or all of the elements described relative to the computer 720, although only a memory storage device 750 is illustrated in FIG. 14. The logical connections depicted in FIG. 14 may include a local area network (LAN) 751 and a wide area network (WAN) 752. Such networking environments are commonplace in offices, enterprise-wide computer networks, Intranets and the Internet.

When employed in a LAN networking environment, the computer 720 may be connected to the local network 751 through a network interface or adapter 753. When utilized in a WAN networking environment, the computer 720 generally may include a modem 754, and/or is connected to a communications server on the LAN, and/or has other means for establishing communications over the wide area network 752, such as the Internet. The modem 754, which may be internal or external, may be connected to the system bus 723 via the serial port interface 746. In a networked environment, program modules depicted relative to the computer 720, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 720, unless otherwise indicated. Such acts and operations are sometimes referred to as being computer-executed. It will be appreciated that the acts and symbolically represented operations include the manipulation by the processing unit 721 of electrical signals representing data bits which causes a resulting transformation or reduction of the electrical signal representation, and the maintenance of data bits at memory locations in the memory system (including the system memory 722, hard drive 727, floppy disks 729, and CD-ROM 731) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A computer system having a user interface to deploy a service, the user interface comprising:

at least one display object to receive user configurations associated with a desired service topology and at least one property, wherein the at least one property includes at least one of private properties relating to a single installation package, general properties relating to multiple installation packages, user input properties, and application properties, and wherein the application properties further comprise at least one of server list properties to map applications to machines and static properties that are specified as part of an application definition;

at least a second display object to select a machine configuration for execution of the service, wherein a schema is utilized to describe the components of the service such that topologies, servers, and server types are defined in accordance with the schema and wherein the service is at least one of a billing-and a provisioning service, and wherein the schema is utilized to describe at least one application of a service, the at least one application mapping to at least one installation package, the installation package describing the components of the service; and at least a third display object to deploy the service, the third display object distributes the components of the service to at least one machine based upon the schema, a selected topology and user input information, the at least one machine is at least one of a client and a server computer, the at least one of the client and the server computer operative in at least one of a local and a remote configuration.

2. The user interface of claim 1, further comprising a selection option to select a location for one or more installation packages of the service.

3. The user interface of claim 1, further comprising a selection option to locate an XML schema that describes deployment instructions for the service.

4. The user interface of claim 1, further comprising a selection option in accordance with a machine type.

5. The user interface of claim 1, further comprising at least one selection option to receive account information, the account information relating to at least one of a server name and a password.

6. The user interface of claim 1, further comprising providing display feedback according to at least one of a configuration error and a parameter conflict.

7. The user interface of claim 1, further comprising at least one of a log option, a details option, and a summary option to provide information relating to at least one of a service installation procedure and a service un-installation procedure.

8. The user interface of claim 3, wherein the XML schema defines at least one of an XML definition schema and an XML deployment schema.

9. The user interface of claim 8, wherein the XML definition schema includes at least one of an application, an installation package, a user input property and an application property.

10. The user interface of claim 8, wherein the XML deployment schema includes at least one of a topology, a server type, and an associated application.

11. The user interface of claim 1, wherein the at least one topology defines at least one of a server and a server type that can execute the service.

12. The user interface of claim 11, wherein the user interface at least one of selects and configures an input property, a topology, an installation package location, a server type, and a subset of servers.

13. The user interface of claim 1, wherein the components of the service including at least one of an executable, a dynamic link libraries (DLL), a file, a data structure, a database, a registry configuration, and an object.

14. A computer readable storage medium having computer executable instructions stored thereon, which when executed by a computer, perform a method to facilitate deployment of services, the method comprising:

receiving user configurations and at least one property associated with a desired service topology, wherein the at least one property includes at least one of private properties relating to a single installation package, general properties relating to multiple installation packages, user input properties, and application properties, and wherein the application properties further comprise at least one of server list properties to map applications to machines and static properties that are specified as part of an application definition;

selecting a machine configuration for execution of a service;

utilizing a schema to describe the components of the service such that topologies, servers, and server types are defined in accordance with the schema and wherein the service is at least one of a billing and a provisioning service;

utilizing the schema to describe at least one application of the service, the at least one application mapping to at least one installation package, the installation package describing the components of the service; and deploying the service via distributing the components of the service to at least one machine based upon the schema, a selected topology and user input information, the at least one machine is at least one of a client and a server computer, the at least one of the client and the server computer operative in at least one of a local and a remote configuration.

15. The method of claim 14, further comprising generating a deployment plan based upon the logical topology and at least one selected configuration property.

16. The method of claim 15, further comprising at least one of:

determining the physical topology; and determining a bounded property that maps service to at least one machine.

17. The method of claim 15, further comprising generating a multiple deployment manifest to describe a plurality of logical topologies.

18. The method of claim 14, further comprising deploying the service based upon the mapping.

19. The method of claim 14, further comprising mapping at least one server to a server type.

20. A system having a computer processor to facilitate deployment of a service, the system comprising:

means for receiving user configurations and at least one property associated with a desired service topology, wherein the at least one property includes at least one of private properties relating to a single installation package, general properties relating to multiple installation packages, user input properties, and application properties;

means for selecting a machine configuration for execution of the service;

means for utilizing a schema to describe the components of the service such that topologies, servers, and server types are defined in accordance with the schema;

means for utilizing the schema to describe at least one application of a service, the at least one application mapping to at least one installation package, the installation package describing the components of the service; and means for deploying the service via distributing the components of the service to at least one machine based upon the schema, a selected topology and user input information, the at least one machine is at least one of a client and a server computer, the at least one of the client and the server computer operative in at least one of a local and a remote configuration.

* * * * *

UNITED STATES PATENT AND TRADEMARK OFFICE

CERTIFICATE OF CORRECTION

PATENT NO. : 7,636,782 B2
APPLICATION NO. : 11/969776
DATED : December 22, 2009
INVENTOR(S) : Kenneth Eugene Jordan et al.

It is certified that error appears in the above-identified patent and that said Letters Patent is hereby corrected as shown below:

In column 16, line 29, in Claim 14, delete “perform” and insert -- performs --, therefor.

Signed and Sealed this
Twenty-fifth Day of January, 2011

David J. Kappos
*Director of the United States Patent and Trademark Office*